US005384061A

United States Patent [19]

Wise

[11] Patent Number: 5,384,061

[45] Date of Patent: Jan. 24, 1995

[54] STABLE THICKENED AQUEOUS CLEANING COMPOSITION CONTAINING A CHLORINE BLEACH AND PHYTIC ACID

[75] Inventor: Rodney M. Wise, Cincinnati, Ohio

[73] Assignee: The Procter & Gamble Co., Cincinnati, Ohio

[21] Appl. No.: 172,401

[22] Filed: Dec. 23, 1993

[51] Int. Cl.[6] .......... C09K 15/32; C11D 7/26; C11D 7/36; C11D 7/54

[52] U.S. Cl. .......... 252/95; 252/89.1; 252/99; 252/103; 252/173; 252/174.16; 252/174.24; 252/186.36; 252/400.2; 252/DIG. 2; 252/DIG. 14

[58] Field of Search .......... 252/95, 99, 103, 89.1, 252/174.14, 174.24, 186.36, 174.16, 400.2, 173, DIG. 14

[56] References Cited

U.S. PATENT DOCUMENTS

| | | | |
|---|---|---|---|
| 2,739,942 | 3/1956 | Eckey | 252/132 |
| 3,950,260 | 4/1976 | Eldib | 252/89 |
| 4,219,435 | 8/1980 | Biard et al. | 252/90 |
| 4,219,436 | 8/1980 | Gromer et al. | 252/135 |
| 4,357,254 | 11/1982 | Kapiloff et al. | 252/181 |
| 4,539,130 | 9/1985 | Thompson et al. | 252/94 |
| 4,576,728 | 3/1986 | Stoddart | 252/102 |
| 4,655,953 | 4/1987 | Oakes | 252/99 |
| 4,740,327 | 4/1988 | Julemont et al. | 252/103 |
| 4,842,757 | 6/1989 | Reboa et al. | 252/76 |
| 4,859,358 | 8/1989 | Gabriel et al. | 252/99 |
| 4,941,988 | 7/1990 | Wise | 252/99 |
| 5,057,237 | 10/1991 | Drapier et al. | 252/97 |
| 5,169,552 | 12/1992 | Wise | 252/95 |
| 5,227,085 | 7/1993 | Motsenbocker | 252/99 |

FOREIGN PATENT DOCUMENTS

| | | | |
|---|---|---|---|
| 56-057-898 | 5/1981 | Japan | C11D 7/36 |
| 59-074-199-A | 4/1984 | Japan | C11D 3/20 |
| 60-184-002-A | 9/1985 | Japan . | |
| 60-212-496-A | 10/1985 | Japan | C11D 3/38 |
| 60-212-497-A | 10/1985 | Japan | C11D 3/38 |
| 61-145-300-A | 7/1986 | Japan | C11D 7/02 |
| 61-276-900-A | 12/1986 | Japan . | |
| 62-000-418-A | 1/1987 | Japan | A61K 7/22 |
| 63-161-090-A | 7/1988 | Japan | C11D 7/60 |
| 3-115-399-A | 5/1991 | Japan | C11D 3/50 |
| 3-199-094-A | 8/1991 | Japan | B41N 3/06 |

OTHER PUBLICATIONS

Copending Application 08/092,161, Wise et al, filed Jul. 15, 1993.

*Primary Examiner*—Dennis Albrecht
*Attorney, Agent, or Firm*—Fernando A. Borrego

[57] ABSTRACT

Aqueous, thickened liquid or gel cleaning compositions displaying enhanced chemical and physical stability are provided. The compositions comprise a chlorine bleach ingredient, cross-linked polycarboxylate polymer, phytic acid, a theology stabilizing agent, and a buffering agent to maintain the pH of the composition above about 10. The phytic acid component is, preferably, substantially free of hypochlorite-reactive species. Preferred automatic dishwashing detergent compositions containing builder and optional surfactant and metalate, and displaying shear thinning behavior, are also disclosed.

32 Claims, No Drawings

STABLE THICKENED AQUEOUS CLEANING COMPOSITION CONTAINING A CHLORINE BLEACH AND PHYTIC ACID

TECHNICAL FIELD

This invention relates to aqueous thickened liquid or gel cleaning compositions containing a chlorine bleach ingredient, cross-linked polycarboxylate polymers, phytic acid, rheology stabilizing agent and a buffering agent. Preferably, the phytic acid component is substantially free of hypochlorite-reactive species. These compositions display enhanced chemical and physical stability. One particular application relates to an automatic dishwashing detergent composition additionally containing builder and optional surfactant and metalate, which exhibits shear-thinning behavior, i.e., high viscosity at low rates of shear and lower viscosities at high rates of shear.

BACKGROUND OF THE INVENTION

Thickened aqueous cleaning compositions are known, having been taught in U.S. Pat. Nos. 3,843,548; 3,558,496; 3,684,722; 4,005,027; and 4,116,851.

The use of bleaches in cleaning housewares is known, having been taught in U.S. Pat. Nos. 3,928,065; 3,708,429; 3,058,917; and 3,671,440.

The use of polycarboxylate polymers in cleaning compositions is known, as disclosed in U.S. Pat. Nos. 3,060,124; 3,671,440; 4,392,977; 4,147,650; and 4,836,948; U.K. Pat. No. 1527706; and U.K. Pat. Application No. 2203163A.

The use of phytic acid or salts or derivatives thereof in cleaning compositions is known, as taught in Japanese Patent Publication Nos. JP-310568; JP-118182; and JP-253092.

However, none of the above references discloses compositions containing a cross-linked polycarboxylate polymer, a chlorine bleach ingredient, phytic acid, a rheology stabilizing agent and a buffering agent. None of the references discloses the advantage of using a purified form of phytic acid in combination with a rheology stabilizing agent to provide physical and chemical stability to thickened aqueous cleaning compositions.

SUMMARY OF THE INVENTION

The compositions of this invention are aqueous thickened liquid or gel cleaning compositions comprising, by weight of the composition:

(a) a chlorine bleach ingredient providing from about 0.2 to 2.5% available chlorine;

(b) from about 0.1 to 10% of a cross-linked polycarboxylate polymer thickening agent;

(c) from about 0.05 to 5% of phytic acid;

(d) from about 0.05 to 5% of a rheology stabilizing agent;

(e) sufficient alkalinity buffering agent to provide said composition with a pH greater than about 10; and (f) at least about 5% water.

A particularly preferred embodiment of this invention is an automatic dishwashing detergent composition further comprising:

(a) from 0% to about 5% of a detergent surfactant;

(b) from about 5 to 50% of a detergency builder material: and (c) from 0% to about 1% of an alkali metal salt of an amphoteric metal anion.

DETAILED DESCRIPTION OF THE INVENTION

In addition to water, the compositions of the present invention comprise five essential ingredients: a chlorine bleach ingredient, a cross-linked polycarboxylate polymer thickening agent, phytic acid, a rheology stabilizing agent, and an alkalinity buffering agent.

Chlorine Bleach Ingredient

The instant compositions include a bleach ingredient which yields a hypochlorite species in aqueous solution. The hypochlorite ion is chemically represented by the formula $OCl-$. The hypochlorite ion is a strong oxidizing agent, and materials which yield this species are considered to be powerful bleaching agents.

The strength of an aqueous solution containing hypochlorite ion is measured in terms of available chlorine. This is the oxidizing power of the solution measured by the ability of the solution to liberate iodine from an acidified iodide solution. One hypochlorite ion has the oxidizing power of 2 atoms of chlorine, i.e., one molecule of chlorine gas.

At lower pH levels, aqueous solutions formed by dissolving hypochlorite-yielding compounds contain active chlorine, partially in the form of hypochlorous acid moieties and partially in the form of hypochlorite ions. At pH levels above about 10, i.e., at the pH levels of the instant compositions, essentially all (greater than 99%) of the active chlorine is reported to be in the form of hypochlorite ion.

Those bleaching agents which yield a hypochlorite species in aqueous solutions include alkali metal and alkaline earth metal hypochlorites, hypochlorite addition products, chloramines, chlorimines, chloramides, and chlorimides. Specific examples of compounds of this type include sodium hypochlorite, potassium hypochlorite, monobasic calcium hypochlorite, dibasic magnesium hypochlorite, chlorinated trisodium phosphate dodecahydrate, potassium dichloroisocyanurate, sodium dichloroisocyanurate, sodium dichloroisocyanurate dihydrate, trichlorocyanuric acid, 1,3-dichloro-5,5-dimethylhydantoin, N-chlorosulfamide, Chloramine T, Dichloramine T, Chloramine B and Dichloramine B. A preferred bleaching agent for use in the compositions of the instant invention is sodium hypochlorite, potassium hypochlorite, or a mixture thereof.

Most of the above-described hypochlorite-yielding bleaching agents are available in solid or concentrated form and are dissolved in water during preparation of the compositions of the instant invention. Some of the above materials are available as aqueous solutions.

A majority of the above-described bleaching agents are dissolved in the aqueous liquid component of the present composition. Others may appear in the form of suspended particles in the composition. Bleaching agents should be used in a sufficient amount to provide from about 0.2% to about 2.5% available chlorine, preferably from about 0.5% to about 1.5% available chlorine, by weight of the total composition.

Polymeric Thickening Agent

The thickening agent in the compositions of the present invention is a cross-linked polycarboxylate polymer thickening agent. This polymer preferably has a molecular weight of from about 500,000 to about 5,000,000, more preferably from about 750,000 to about 4,000,000.

The polycarboxylate polymer is preferably a carboxyvinyl polymer. Such compounds are disclosed in U.S. Pat. No. 2,798,053, issued on Jul. 2, 1957, to Brown, the specification of which is hereby incorporated by reference. Methods for making carboxyvinyl polymers are also disclosed in Brown.

A carboxyvinyl polymer is an interpolymer of a monomeric mixture comprising a monomeric olefinically unsaturated carboxylic acid, and from about 0.1% to about 10% by weight of the total monomers of a polyether of a polyhydric alcohol, which polyhydric alcohol contains at least four carbon atoms to which are attached at least three hydroxyl groups, the polyether containing more than one alkenyl group per molecule. Other mono-olefinic monomeric materials may be present in the monomeric mixture if desired, even in predominant proportion. Carboxyvinyl polymers are substantially insoluble in liquid, volatile organic hydrocarbons and are dimensionally stable on exposure to air.

Preferred polyhydric alcohols used to produce carboxyvinyl polymers include polyols selected from the class consisting of oligosaccarides, reduced derivatives thereof in which the carbonyl group is converted to an alcohol group, and pentaerythritol most preferred is sucrose or pentaerythritol. It is preferred that the hydroxyl groups of the modified polyol be etherified with allyl groups, the polyol having at least two allyl ether groups per polyol molecule. When the polyol is sucrose, it is preferred that the sucrose have at least about five allyl ether groups per sucrose molecule. It is preferred that the polyether of the polyol comprise from about 0.1% to about 4% of the total monomers, more preferably from about 0.2% to about 2.5%.

Preferred monomeric olefinically unsaturated carboxylic acids for use in producing carboxyvinyl polymers used herein include monomeric, polymerizable, alpha-beta mono-olefinically unsaturated lower aliphatic carboxylic acids; more preferred are monomeric mono-olefinic acrylic acids of the structure $$CH_2{=}\overset{\overset{\displaystyle R}{|}}{C}{-}COOH$$

where R is a substituent selected from the group consisting of hydrogen and lower alkyl groups; most preferred is acrylic acid.

Various carboxyvinyl polymers are commercially available from B. F. Goodrich Company, New York, N.Y., under the trade name Carbopol®. These polymers are also known as carbomers or polyacrylic acids. Carboxyvinyl polymers useful in formulations of the present invention include Carbopol 910 having a molecular weight of about 750,000, Carbopol 941 having a molecular weight of about 1,250,000, and Carbopols 934 and 940 having molecular weights of about 3,000,000 and 4,000,000, respectively.

Preferred polycarboxylate polymers of the present invention are non-linear, water-dispersible, polyacrylic acid cross-linked with a polyalkenyl polyether and having a molecular weight of from about 750,000 to about 4,000,000.

Highly preferred examples of these polycarboxylate polymers for use in the present invention are BASF Corporation's Sokalan PHC-25®, Polygel DK available from 3-V Chemical Corporation, and the Carbopol 600 series resins available from B. F. Goodrich, especially Carbopol 614, 616 and 617. It is believed that these are more highly cross-linked than the 900 Carbopol series polymers and have molecular weights between about 1,000,000 and 4,000,000. Mixtures of polycarboxylate polymers as herein described may also be used in the present invention.

The polycarboxylate polymer thickening agent is preferably utilized with essentially no clay thickening agents since the presence of clay usually results in a less desirable product having phase instability. In other words, the polycarboxylate polymer is preferably used instead of clay as a thickening agent in the present compositions.

The polycarboxylate polymer thickening agent in the compositions of the present invention is present at a level of from about 0.1% to about 10%, preferably from about 0.25% to about 5%, most preferably from about 0.5% to about 2%.

In the preferred automatic dishwashing detergent composition, the polycarboxylate polymer thickening agent provides an apparent viscosity at high shear of greater than about 500 centipoise and an apparent yield value of from about 40 to about 800, and most preferably from about 60 to about 600, dynes/$cm^2$ to the composition.

Apparent viscosities at high shear are determined with a Brookfield RVT viscometer with spindle #6 at 100 rpm, reading the torque at 30 seconds.

The yield value is an indication of the shear stress at which the gel strength is exceeded and flow is initiated. It is measured herein with a Brookfield RVT model viscometer with a T-bar B spindle at about 77° F. (25° C.) utilizing a Helipath drive during associated readings. The system is set to 0.5 rpm and a torque reading is taken for the composition to be tested after 30 seconds or after the system is stable. The system is stopped and the rpm is reset to 1.0 rpm. A torque reading is taken for the same composition after 30 seconds or after the system is stable.

Apparent viscosities are calculated from the torque readings using factors provided with the Brookfield viscometer. An apparent or Brookfield yield value is then calculated as: Brookfield Yield Value=(apparent viscosity at 0.5 rpm—apparent viscosity at 1 rpm)/100. This is the common method of calculation, published in Carbopol® literature from the B. F. Goodrich Company and in other published references. In the cases of most of the formulations quoted herein, this apparent yield value is approximately four times higher than yield values calculated from shear rate and stress measurements in more rigorous rheological equipment.

Phytic Acid

The phytic acid component useful in the present invention is present in an amount of from about 0.05% to about 5%, preferably from about 0.1% to about 2%, most preferably from about 0.2% to about 1%, by weight of the composition.

Phytic acid, a hexa-phosphoric acid, occurs naturally in the seeds of many cereal grains, generally in the form of the insoluble calcium-magnesium salt. It may also be derived from corn steep liquor. Commercial grade phytic acid is commercially available from J. T. Baker Co., e.g., as a 40% aqueous solution.

A clear benefit is seen in the chemical and physical stability of compositions containing a cross-linked polycarboxylate polymer thickening agent and a chlorine bleach ingredient when phytic acid, preferably containing little or no hypochlorite-reactive species, and a rheology stabilizing agent are added to such compositions.

It is intended that the present invention cover the acidic form of phytic acid as well as alkali metal salt derivatives thereof, particularly sodium or potassium salts thereof. Sodium phytate is available from Jonas Chemical Co. (Brooklyn, N.Y.). In fact, since the pH of compositions of the present invention are in the alkaline range, the phytic acid component exists primarily as the ionized salt in the aqueous compositions herein even if it is added in its acidic form. Mixtures of such salts of phytic acid are also covered herein.

A small addition of the phytic acid component substantially increases the chemical stability of the cross-linked polycarboxylate polymer thickening agent in the presence of the chlorine bleach ingredient in the compositions of the present invention. As a result of the chemical stability of such thickening agent, also provided is physical stability, i.e., theological stability, to the compositions of the present invention. Without wishing to be bound by theory, it is believed that the phytic acid component functions as a bleach-stable chelant, complexing transition metals which can generate free radicals in the presence of hypochlorite bleach.

Commercial grade phytic acid can contain a significant amount of impurities, many of which are reactive to hypochlorite ion and the reactive species it generates in aqueous compositions. Care should be taken to ensure that the level of such impurities is not significantly high. Therefore, the phytic acid component is, preferably, substantially free of such hypochlorite ion-reactive species. To obtain phytic acid that contains little or no hypochlorite-reactive species from commercial grade phytic acid it must be processed to remove such hypochlorite-reactive species or make such species inert toward hypochlorite ion, i.e., deactivate the hypochlorite-reactive species. Such phytic acid component preferably undergoes a purification process wherein hypochlorite-reactive species are inactivated or removed therefrom leaving a phytic acid rheology stabilizing agent that is substantially free of such hypochlorite-reactive species. Such processes include pre-treatment of an aqueous solution of the phytic acid with hypochlorite bleach.

An exemplary method for inactivating hypochlorite-reactive species in commercial grade phytic acid comprises pre-treating the commercial grade phytic acid (or neutralized phytic acid) with a weak hypochlorite solution. The solution is preferably aged for at least about 24 hours in the solution.

Rheology Stabilizing Agent

The compositions of the invention also contain from about 0.05% to about 5%, preferably from about 0.1% to about 2%, more preferably from about 0.2% to about 1%, by weight of the composition, of a theology stabilizing agent. Such component can be characterized as any material that functions as a free radical scavenger in an aqueous composition containing a chlorine bleach ingredient.

Rheology stabilizing agents useful herein include benzoic acids described in U.S. Pat. No. 5,169,552 (Wise), incorporated herein by reference. Also included are sulfo benzenes having the formula

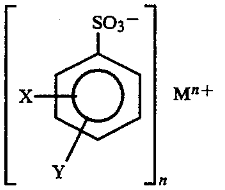
or
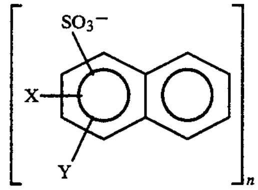

wherein each X and Y is —H, —Cl, —Br, $—SO_3—M^+$, $—NO_2$, $—OCH_3$, $—CH_3$, $—CH_2CH_3$, $—CH_2CH_2CH_3$, or $—C(CH_3)_3$; and M is H, an alkali metal, or an alkaline earth metal; and n is 1 where M is H or an alkali metal cation and n is 2 when M is an alkaline earth metal cation.

Cross-linked polymers, especially those of high molecular weight, as used in the present bleach-containing composition, are vulnerable to bleach-initiated degradation and result in a loss of rheology that can be unacceptable for most applications. A certain small percentage of the chlorine bleach ingredient is present in solution in the form of a free radical, i.e., a molecular fragment having one or more unpaired electrons. These radicals, although short lived, are highly reactive and may initiate the degradation of certain other species in solution, including the cross-linked polycarboxylate polymers, via propagation mechanism. The polymers of this invention are susceptible to this degradation because of the presumed oxidizable sites present in the cross-linking structure.

A small addition of a rheology stabilizing agent substantially increases the physical stability, i.e., rheological stability, of the compositions of the present invention. Also provided is chemical stability of the chlorine bleach ingredient present in the compositions of the present invention. Without wishing to be bound by theory, it is believed that the rheology stabilizing agent functions as a free radical scavenger, tying up the highly reactive species in the composition and preventing them from attacking the degradation-susceptible structure of the polycarboxylate polymers. Agents which stabilize the theology of a composition by more rapidly consuming or reacting the free chlorine bleach are not functioning according to the invention herein.

It is believed, although not wishing to be bound by theory, that the theology stabilizing agent herein functions as a free-radical scavenger. However, their function can be limited by transition metal contaminants which appear in other ingredients present in the composition. In such cases, the phytic acid component (including salts thereof) is believed to complex with the transition metals and prevent or inhibit the promotion of free radicals. Transition metals include multi-valent ions that can exist in multiple oxidative states, e.g., copper, iron and manganese.

It is intended that the present invention cover the acidic form of theology stabilizing agents as well as alkali metal salt derivatives thereof, particularly sodium or potassium salts thereof. In fact, since the pH of compositions of the present invention are in the alkaline range, the rheology stabilizing agent exists primarily as the ionized salt in the aqueous compositions of the invention herein even if it is added in its acidic form. Mixtures of the above theology stabilizing agents may be used in the present invention.

Buffering Agent

In the instant compositions, it is generally desirable to also include one or more buffering agents capable of maintaining the pH of the compositions within the alkaline range, determined as the pH of the undiluted composition ("as is") with a pH meter. It is in this pH range that optimum performance and stability of the bleach are realized, and it is also within this pH range wherein optimum composition chemical and physical stability are achieved.

Maintenance of the composition pH above about 10, preferably above about 11.5, minimizes undesirable chemical decomposition of the active chlorine, hypochlorite-yielding bleaching agents. Maintenance of this particular pH range also minimizes the chemical interaction between the strong hypochlorite bleach and the surfactant compounds present in the instant compositions. Finally, as noted, high pH values such as those maintained by an optional buffering agent serve to enhance the soil and stain removal properties during utilization of the present compositions.

Any compatible material or mixture of materials which has the effect of maintaining the composition pH within the alkaline pH range, and preferably within a 10 to about 13 range, can be utilized as the buffering agent in the instant invention. Such materials can include, for example, various water-soluble, inorganic salts such as the carbonates, bicarbonates, sesquicarbonates, silicates, pyrophosphates, phosphates, tetraborates, and mixtures thereof.

Examples of materials which can be used either alone or in combination as the buffering agent herein include sodium carbonate, sodium bicarbonate, potassium carbonate, sodium sesquicarbonate, sodium silicate, potassium silicate, sodium pyrophosphate, tetrapotassium pyrophosphate, tripotassium phosphate, trisodium phosphate, anhydrous sodium tetraborate, sodium tetraborate pentahydrate, potassium hydroxide, sodium hydroxide, and sodium tetraborate decahydrate. Combination of these buffering agents, which include both the sodium and potassium salts, may be used. This may include mixtures of tetrapotassium pyrophosphate and trisodium phosphate in a pyrophosphate/phosphate weight ratio of about 3:1, mixtures of tetrapotassium pyrophosphate and tripotassium phosphate in a pyrophosphate/phosphate weight ratio of about 3:1, and mixtures of anhydrous sodium carbonate and sodium silicate in a carbonate/silicate weight ratio of about 1:3 to about 3:1, preferably from about 1:2 to about 2:1.

If present, the above-described buffering agent materials are dissolved or suspended in the aqueous component. Buffering agents can generally comprise from 1% to about 25% by weight, preferably from about 2.5% to about 20% by weight, of the total composition.

Water

Compositions of the present invention contain at least about 5% water, preferably from about 15 to 80% water, most preferably from about 30 to 70% water, by weight of the composition. Water incorporated into the compositions is preferably softened or deionized.

Detergent Surfactants

The compositions of this invention can contain from 0% to about 5%, preferably from about 0.1% to about 2.5%, of a bleach-stable detergent surfactant.

Desirable detergent surfactants, in general, include nonionic detergent surfactants, anionic detergent surfactants, amphoteric and zwitterionic detergent surfactants, and mixtures thereof.

Examples of nonionic surfactants include:

(1) The condensation product of 1 mole of a straight- or branched-chain alcohol or fatty acid containing from about 10 to about 20 carbon atoms with from about 4 to about 50 moles of ethylene oxide. Specific examples of such compounds include a condensation product of 1 mole of coconut fatty acid or tallow fatty acid with 10 moles of ethylene oxide; the condensation of 1 mole of oleic acid with 9 moles of ethylene oxide; the condensation product of 1 mole of stearic acid with 25 moles of ethylene oxide; the condensation product of 1 mole of tallow fatty alcohols with about 9 moles of ethylene oxide; the condensation product of 1 mole of oleyl alcohol with 10 moles of ethylene oxide; the condensation product of 1 mole of $C_{19}$ alcohol and 8 moles of ethylene oxide; and the condensation product of one mole of $C_{18}$ alcohol and 9 moles of ethylene oxide.

The condensation product of a fatty alcohol containing from 17 to 19 carbon atoms, with from about 6 to about 15 moles, preferably 7 to 12 moles, most preferably 9 moles, of ethylene oxide provides superior spotting and filming performance. More particularly, it is desirable that the fatty alcohol contain 18 carbon atoms and be condensed with from about 7.5 to about 12, preferably about 9, moles of ethylene oxide. These various specific $C_{17}$–$C_{19}$ ethoxylates give extremely good performance even at lower levels (e.g., 2.5%–3%) and at the higher levels (less than 5%) are sufficiently low sudsing, especially when capped with a low molecular weight ($C_{1-5}$) acid or alcohol moiety, so as to minimize or eliminate the need for a suds-suppressing agent. Suds-suppressing agents in general tend to act as a load on the composition and to hurt long term spotting and filming characteristics.

(2) Polyethylene glycols or polypropylene glycols having molecular weight of from about 1,400 to about 30,000, e.g., 20,000; 9,500; 7,500; 6,000; 4,500; 3,400; and 1,450. All of these materials are wax-like solids which melt between 110° F.(43° C.) and 200° F.(93° C.).

(3) The condensation products of 1 mole of alkyl phenol wherein the alkyl chain contains from about 8 to about 18 carbon atoms and from about 4 to about 50 moles of ethylene oxide. Specific examples of these nonionics are the condensation products of 1 mole of decylphenol with 40 moles of ethylene oxide; the condensation product of 1 mole of dodecyl phenol with 35 moles of ethylene oxide; the condensation product of 1 mole of tetradecylphenol with 25 moles of ethylene oxide; the condensation product of 1 mole of hectadecylphenol with 30 moles of ethylene oxide, etc.

(4) Polyoxypropylene, polyoxyethylene condensates having the formula $HO(C_2H_4O)x(C_3H_6O)y(C_2H_4O)_xH$ or $HO(C_3H_6O)y(C_2H_4O)x\ (C_3H_6O)_yH$ where total y equals at least 15 and total $(C_2H_4O)$ equals 20% to 90% of the total weight of the compound and the molecular weight is from about 2,000 to about 10,000, preferably from about 3,000 to about 6,000. These materials are, for example, the Pluronics which are well known in the art.

(5) The compounds of (1) or (4) which are capped with propylene oxide, butylene oxide and/or short chain alcohols and/or short chain fatty acids, e.g., those containing from 1 to about 5 carbon atoms, and mixtures thereof.

Generally, useful surfactants in detergent compositions include those having the formula $RO-(C_2H_4O)_xR^1$ wherein R is an alkyl or alkylene group containing from 17 to 19 carbon atoms, x is a number from about 6 to about 15, preferably from about 7 to about 12, and $R^1$ is selected from the group consisting of: preferably, hydrogen, $C_{1-5}$ alkyl groups, $C_{2-5}$ acyl groups and groups having the formula $—(C_yH_{2y}O)_nH$ wherein y is 3 or 4 and n is a number from one to about 4.

In addition to the above-mentioned surfactants, other surfactants useful in detergent compositions can be found in the disclosures of U.S. Pat. Nos. 3,544,473, 3,630,923, 3,888,781 and 4,001,132, all of which are incorporated herein by reference.

However, since the compositions of the invention herein contain a hypochlorite bleach, it is preferable that the detergent surfactant be bleach-stable. Such surfactants desirably do not contain functions such as unsaturation and some aromatic, amide, aldehydic, methyl keto or hydroxyl groups which are susceptible to oxidation by the hypochlorite. If such functions or groups are present in the surfactant, it is preferred that sufficient hydrophobic character be present therein to put the surfactant into a separated disperse phase in the aqueous composition.

Bleach-stable anionic surfactants which are especially resistant to hypochlorite oxidation fall into two main groups. One such class of bleach-stable anionic surfactants are the water-soluble alkyl sulfates and/or sulfonates, containing from about 8 to 18 carbon atoms in the alkyl group. Alkyl sulfates are the water-soluble salts of sulfated fatty alcohols. They are produced from natural or synthetic fatty alcohols containing from about 8 to 18 carbon atoms. Natural fatty alcohols include those produced by reducing the glycerides of naturally occurring fats and oils. Fatty alcohols can be produced synthetically, for example, by the Oxo process. Examples of suitable alcohols which can be employed in alkyl sulfate manufacture include decyl, lauryl, myristyl, palmityl and stearyl alcohols and the mixtures of fatty alcohols derived by reducing the glycerides of tallow and coconut oil.

Specific examples of alkyl sulfate salts which can be employed in the instant detergent compositions include sodium lauryl alkyl sulfate, sodium stearyl alkyl sulfate, sodium palmityl alkyl sulfate, sodium decyl sulfate, sodium myristyl alkyl sulfate, potassium lauryl alkyl sulfate, potassium stearyl alkyl sulfate, potassium decyl sulfate, potassium palmityl alkyl sulfate, potassium myristyl alkyl sulfate, sodium dodecyl sulfate, potassium dodecyl sulfate, potassium tallow alkyl sulfate, sodium tallow alkyl sulfate, sodium coconut alkyl sulfate, magnesium coconut alkyl sulfate, calcium coconut alkyl sulfate, potassium coconut alkyl sulfate and mixtures of these surfactants. Highly preferred alkyl sulfates are sodium coconut alkyl sulfate, potassium coconut alkyl sulfate, potassium lauryl alkyl sulfate and sodium lauryl alkyl sulfate.

A preferred sulfonated anionic surfactant is the alkali metal salt of secondary alkane sulfonates, an example of which is the Hostapur SAS from Hoechst Celanese.

A second class of bleach-stable surfactant materials operable in the instant invention are the water-soluble betaine surfactants. These materials have the general formula:

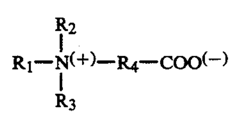

wherein $R_1$ is an alkyl group containing from about 8 to 18 carbon atoms; $R_2$ and $R_3$ are each lower alkyl groups containing from about 1 to 4 carbon atoms, and R4 is an alkylene group selected from the group consisting of methylene, propylene, butylene and pentylene. (Propionate betaines decompose in aqueous solution and hence are not included in the instant compositions).

Examples of suitable betaine compounds of this type include dodecyldimethylammonium acetate, tetradecyldimethylammonium acetate, hexadecyldimethylammonium acetate, alkyldimethylammonium acetate wherein the alkyl group averages about 14.8 carbon atoms in length, dodecyldimethylammonium butanoate, tetradecyldimethylammonium butanoate, hexadecyldimethylammonium butanoate, dodecyldimethylammonium hexanoate, hexadecyldimethylammonium hexanoate, tetradecyldiethylammonium pentanotate and tetradecyldipropyl ammonium pentanoate. Especially preferred betaine surfactants include dodecyldimethylammonium acetate, dodecyldimethylammonium hexanoate, hexadecyldimethylammonium acetate, and hexadecyldimethylammonium hexanoate.

Nonionic surfactants useful herein include ethoxylated and/or propoxylated nonionic surfactants such as those available from BASF Corp. of New Jersey. Examples of such compounds are polyethylene oxide, polypropylene oxide block copolymers sold under the trade names Pluronic ® and Tetronic ® available from BASF Corp.

Preferred members of this class are capped oxyalkylene oxide block copolymer surfactants of the following structure:

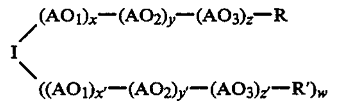

where I is the residue of a monohydroxyl, dihydroxyl, or a polyhydroxyl compound; $AO_1$, $AO_2$, and $AO_3$ are oxyalkyl groups and one of $AO_1$ and $AO_2$ is propylene oxide with the corresponding x or y being greater than zero, and the other of $AO_1$ and $AO_2$ is ethylene oxide with the corresponding x or y being greater than zero, and the molar ratio of propylene oxide to ethylene oxide is from about 2:1 to about 8:1; R and R' are hydrogen, alkyl, aryl, alkyl aryl, aryl alkyl, carbamate, or butylene oxide; w is equal to zero or one; and z, x', y', and z' are greater than or equal to zero.

Other bleach-stable surfactants include amine oxides, phosphine oxides, and sulfoxides. However, such surfactants are usually high sudsing. A disclosure of bleach-stable surfactants can be found in published British Patent Application 2,116,199A; U.S. Pat. No. 4,005,027, Hartman; U.S. Pat. No. 4,116,851, Rupe et al; U.S. Pat. No. 3,985,668, Hartman; U.S. Pat. No. 4,271,030, Brierley et al; and U.S. Pat. No. 4,116,849, Leikhim, all of which are incorporated herein by reference.

Other desirable bleach-stable surfactants are the alkyl phosphonates, taught in U.S. Pat. No. 4,105,573, to Jacobsen, issued Aug. 8, 1978, incorporated herein by reference.

Still other preferred bleach-stable anionic surfactants include the linear or branched alkali metal mono- and/or di-($C_{8-14}$) alkyl diphenyl oxide mono- and/or disulfonates, commercially available under the trade names Dowfax 3B-2 (sodium n-decyl diphenyloxide disulfonate) and Dowfax 2A-1. These and similar surfactants are disclosed in published U.K. Patent Applications 2,163,447A; 2,163,448A; and 2,164,350A, said applications being incorporated herein by reference.

Detergency Builder

Detergency builders are optional materials which reduce the free calcium and/or magnesium ion concentration in a surfactant-containing aqueous solution. In the preferred automatic dishwashing detergent compositions they are used at a level of from about 5% to about 50%, preferably from about 15% to about 40%. Generally the detergency builder used in liquid automatic dishwashing detergent compositions like those of the present invention, is sodium tripolyphosphate in an amount from about 10% to about 40%, preferably from about 15% to about 30%. Generally a certain percentage of the sodium tripolyphosphate is in an undissolved particulate form suspended in the rest of the detergent composition. A phosphate ester, if present in the composition, works to keep such solid particles suspended in the aqueous solution.

The detergency builder material can be any of the detergent builder materials known in the art which include trisodium phosphate, tetrasodium pyrophosphate, sodium tripolyphoshate, sodium hexametaphosphate, potassium pyrophosphate, potassium tripolyphosphate, potassium hexametaphosphate, sodium silicates having $SiO_2$:$Na_2O$ weight ratios of from about 1:1 to about 3.6:1, sodium carbonate, sodium hydroxide, borax, sodium nitrilotriacetate, sodium carboxymethyloxysuccinate, sodium carboxymethyloxymalonate, polyphosphonates, salts of low molecular weight carboxylic acids, and polycarboxylates, such as polyacrylates or polymaleates, copolymers and mixtures thereof.

Some of the above-described buffering agent materials additionally serve as builders. It is preferred that the buffering agent contain at least one compound capable of additionally acting as a builder.

Alkali Metal Amphoteric Metalate

An optional component of the present invention is an alkali metal salt of an amphoteric metal anion, hereinafter referred to as a metalate. This component can provide additional structuring to the polycarboxylate polymer thickening agent in the preferred liquid automatic dishwashing detergent composition.

The metalate in the automatic dishwashing detergent compositions of the present invention is present at a level of from 0% to about 1%, preferably from about 0.01% to about 0.1%.

The metalates of amphoteric metals, e.g., aluminum, zinc, beryllium, tin, zirconium, titanium, etc., will act similarly in the present invention to provide this polymer structuring benefit. These alternative metalates are intended to be covered by the present invention. A preferred metalate is potassium or sodium aluminate, e.g., $M_2O.Al_2O_3.3H_2O$, where M is K or Na.

One method of incorporating the metalate into the preferred automatic dishwashing detergent composition is by dissolving or colloidally dispersing an amphoteric metal oxide into an aqueous alkali metal hydroxide in an amount equal to or greater than one molar equivalent of the hydroxide. Some metalates, such as sodium aluminate, are commercially available.

The metalate can be added into the composition at any point when the pH of the mixture is above about 10, preferably above about 11.5. A preferred method of incorporating the metalate into the preferred liquid automatic dishwashing detergent composition is by blending the metalate into an aqueous solution of an alkali metal silicate and then incorporating the resultant colloid with other components of the automatic dishwashing detergent composition. The preferred structuring benefit is seen when the or no increased turbidity is visible in the mixture.

Formulation of these compositions with a metalate such as aluminate assures that cationic metal ions such as $Al^{+3}$ are not present to precipitate silicate under such mixing conditions.

The lack of suspended or visible solids in this colloidal silico-metalate, i.e., particle sizes greater than about 1 micron, allows for the finished composition to be a clear or translucent gel when sufficient potassium salts are used to ensure dissolution of other components, i.e., molar ratio of potassium to sodium ions greater than about 1:1, preferably greater than about 3:2.

From 0% to about 15%, preferably from about 3% to about 10%, on a solids basis, of the silico-metalate is added to the polyacrylate polymer thickening agent to get the additional structuring. The molar ratio of aluminum metal to $SiO_2$ in the preferred colloidal dispersion formed should be from about 0.01:1 to about 0.1:1, preferably from about 0.02:1 to about 0.06:1, to get the best structuring benefits.

Other Optional Materials

The compositions of the present invention may optionally comprise certain esters of phosphoric acid (phosphate ester). Phosphate esters are any materials of the general formula:

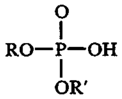
and
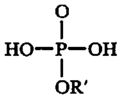

wherein R and R′ are $C_6$–$C_{20}$ alkyl or ethoxylated alkyl groups. Preferably R and R′ are of the general formula: alkyl—$(OCH_2CH_2)Y$ wherein the alkyl substituent is $C_{12}$–$C_{18}$ and Y is between 0 and about 4. Most preferably the alkyl substituent of that formula is $C_{12}$–$C_{18}$ and Y is between about 2 and about 4. Such compounds are prepared by known methods from phosphorus pentoxide, phosphoric acid, or phosphorus oxy halide and alcohols or ethoxylated alcohols.

It will be appreciated that the formula depicted represent mono- and di-esters, and commercial phosphate esters will generally comprise mixtures of the mono- and di-esters, together with some proportion of triester. Typical commercial esters are available under the trademarks "Phospholan" PDB3 (Diamond Shamrock), "Servoxyl" VPAZ (Servo), PCUK-PAE (BASF-Wyandotte), SAPC (Hooker). Preferred for use in the present invention are KN340N and KL340N (Hoescht) and monostearyl acid phosphate (Oxidental Chemical Corp.). Most preferred for use in the present invention is Hostophat-TP-2253 (Hoescht).

The phosphate esters useful herein provide protection of silver and silver-plated utensil surfaces. The phosphate ester component also acts as a suds suppressor in the anionic surfactant-containing detergent compositions disclosed herein.

If a phosphate ester component is used in the compositions of the present invention, it is generally present from about 0.1% to about 5%, preferably from about 0.15% to about 1.0% by weight of the composition.

Metal salts of long chain hydroxy fatty acids have been found to be useful in automatic dishwashing detergent compositions to inhibit tarnishing caused by repeated exposure of sterling or silver-plate flatware to bleach-containing automatic dishwashing detergent compositions (U.S. Pat. No. 4,859,358, Gabriel et al). By "long chain hydroxy fatty acid" is meant the higher aliphatic hydroxy fatty acids having from about 8 to about 22 carbon atoms, preferably from about 10 to 20 carbon atoms, and most preferably from about 12 to 18 carbon atoms, inclusive of the carbon atom of carboxyl group of the fatty acid, e.g., hydroxy stearic acid. By "metal salts" of the long chain hydroxy fatty acids is meant both monovalent and polyvalent metal salts, particularly the sodium, potassium, lithium, aluminum, and zinc salts, e.g., lithium salts of the hydroxy fatty acids. Specific examples of this material are potassium, sodium, and particularly lithium hydroxy stearate. If the metal salts of long chain hydroxy fatty acids are incorporated into the automatic dishwashing detergent compositions of the present invention, this component generally comprises from about 0.05% to about 0.3%, preferably from about 0.05% to about 0.2% by weight of the composition.

Conventional coloring agents and perfumes can also be added to the instant compositions to enhance their aesthetic appeal and/or consumer acceptability. These materials should, of course, be those dye and perfume varieties which are especially stable against degradation by high pH and/or strong active chlorine bleaching agents.

If present, the above-described other optional materials generally comprise no more than about 10% by weight of the total composition and are dissolved, suspended, or emulsified in the present compositions.

Process

Conventional methods can be used to prepare the liquid or gel cleaning compositions herein described. See, for example, U.S. Pat. Nos. 4,824,590, Roselle, issued Apr. 25, 1989; 5,053,158, Dixit et al, issued Oct. 1, 1991; 4,970,016, Ahmed et al, issued Nov. 13, 1990; 5,057,237, Drapier et al, issued Oct. 15, 1991; 5,078,027, Dixit et al, issued Dec. 24, 1991; and 4,941,988, Wise, issued Jul. 17, 1990. A preferred method for preparing a final product of the present invention comprises:

(a) mixing water and alkalinity buffering agent under low to medium shear rates;

(b) adding optional builder;

(c) adding a thickener slurry and mixing under medium shear with moderate heating until desired theological properties are achieved;

(d) adding optional surfactant, phytic acid component, rheology stabilizing agent, and other suitable agents; and (e) adding chlorine bleach ingredient after cooling the mixture to less than about 90° F.

An alternate method comprises adding the ingredients in step a) to the pre-slurried thickener in water and mixing under medium shear as in step (c).

Another alternate method comprises adding the thickening agent after step (d) but before adding the chlorine bleach ingredient. The thickening agent may be added as either a powder or slurry.

As used herein all percentages, parts, and ratios are by weight unless otherwise stated.

The following Examples illustrate the invention and facilitate its understanding.

Example I

Automatic dishwashing detergent compositions are as follows:

| Ingredient | % By Weight | | |
|---|---|---|---|
| Active Basis: | A | B | C |
| Sodium tripolyphosphate (STPP) | 4.67 | 4.67 | 4.67 |
| Tetrapotassium pyrophosphate (TKPP) | 12.60 | 12.60 | 12.60 |
| Sodium silicate, 2.4 ratio | 3.27 | 3.27 | 3.27 |
| Alumina ($Al_2O_3$, added as sodium aluminate) | 0.03 | 0.03 | 0.03 |
| Potassium carbonate ($K_2CO3$) | 3.91 | 3.91 | 3.91 |
| Sodium carbonate ($Na_2CO3$) | 2.61 | 2.61 | 2.61 |
| Available chlorine (added as NaOCl) | 0.93 | 0.93 | 0.93 |
| Potassium hydroxide (KOH) | 0.84 | 0.84 | 0.84 |
| Polyacrylic acid (Sokalan PHC-25) | 1.08 | 1.08 | 1.08 |
| Benzoic Acid | 0.00 | 0.19 | 0.00 |
| Phytic acid (practical grade, 40% in water) | 0.00 | 0.00 | 0.47 |
| Monostearyl acid phosphate (MSAP) | 0.03 | 0.03 | 0.03 |
| Trim KOH, to pH 12.2–12.3 | 0–0.3 | 0–0.3 | 0–0.3 |
| Perfume, dye, trim water to 100% | | Balance | |

| Ingredient | % By Weight | | |
|---|---|---|---|
| Active Basis: | D | E | F |
| Sodium tripolyphosphate (STPP) | 4.67 | 4.67 | 4.67 |
| Tetrapotassium pyrophosphate (TKPP) | 12.60 | 12.60 | 12.60 |
| Sodium silicate, 2.4 ratio | 3.27 | 3.27 | 3.27 |
| Alumina ($Al_2O_3$, added as sodium aluminate) | 0.00 | 0.00 | 0.00 |
| Potassium carbonate ($K_2CO3$) | 3.91 | 3.91 | 3.91 |
| Sodium carbonate ($Na_2CO3$) | 2.61 | 2.61 | 2.61 |
| Available chlorine (added as NaOCl) | 0.93 | 0.93 | 0.93 |
| Potassium hydroxide (KOH) | 0.84 | 0.84 | 0.84 |
| Polyacrylic acid (Sokalan PHC-25) | 1.26 | 1.26 | 1.26 |
| Benzoic Acid | 0.00 | 0.47 | 0.47 |
| Phytic acid (practical grade, 40% in water) | 0.00 | 0.00 | 0.47 |
| Monostearyl acid phosphate (MSAP) | 0.00 | 0.00 | 0.00 |
| Trim KOH, to pH 12.2–12.3 | 0–0.3 | 0–0.3 | 0–0.3 |
| Perfume, dye, trim water to 100% | | Balance | |
| Neat DH of Compositions | | 12.2–12.3 | |

The polyacrylic acid is slurried into demineralized water at 3.4% by weight. All other ingredients are added in the following order while stirring with a paddle blade mixer: additional available trim water, TKPP as a 60% aqueous solution, and KOH (45% in water, sodium aluminate (if present, dissolved in water to make a 2.2% $Al_2O_3$ solution), silicate as 47.3% solids in water, sodium and potassium carbonates and STPP as dry powders (essentially dissolved within five minutes), a 2.6% aqueous slurry of MSAP suds suppressant (if present), and the phytic and/or benzoic acid components (if present). The acids are neutralized by the excess caustic already present in the composition. Heat is added during mixing up to this point so that the mixture temperature is above about 130° F. (54° C.). This temperature is maintained for at least five minutes to aid in sample equilibration. After the composition has cooled to about 90° F. (32° C.) or below, optional perfume and colorants are added. Aqueous sodium hypochlorite is then added as approximately 13% available chlorine. The compositions are essentially clear or translucent, with no visible particles and negligible turbidity. Balance water is added, along with sufficient KOH trim to adjust the pH of the composition "as is" to 12.2–12.3, and further KOH trim is used if needed after overnight equilibration.

After about one to three days of equilibration, samples of the above composition exhibit an apparent Brookfield yield value of about 100 to 300 dynes/$cm^2$, an apparent viscosity at high shear (100 rpm, Brookfield RVT #6) of about 1300 to 4000 cps, and an apparent viscosity at moderate shear 20 rpm, Brookfield RVT #6) of about 4000 to 8000 cps.

Physical properties are recorded, and light-shielded bottled samples are placed in 100° F. (38° C.) and 120° F. (49° C.) conditions. Brookfield apparent viscosities are determined with a Brookfield RVT model with #6 spindle at 100 RPM. In the rapid aging condition of 100° F. (38° C.), the following viscosity readings are taken at the noted intervals. The day following the making of the composition is the initial day.

| Composition | Initial Viscosity (Centipoise) | % of Initial Viscosity After: 1 Week | 4 Weeks | 8 Weeks | 12 Weeks | 18 Weeks |
|---|---|---|---|---|---|---|
| A | 1900 | 112 | 50 | * | ** | ** |
| B | 1830 | 94 | 126 | 23 | ** | ** |
| C | 1920 | 129 | 32 | * | ** | ** |
| D | 2400 | 126 | 34 | * | ** | ** |
| E | 2640 | 104 | 102 | 83 | 60 | 14 |
| F | 2520 | 114 | 106 | 111 | 107 | 86 |

*Measured viscosity below 10% of initial or approaching water-thin by appearance.
**Not measured.

In compositions A, B and C, it is seen that the rheology of composition A deteriorates rapidly in four weeks of rapid aging at 100° F. The presence of a low level of benzoic acid in composition B extends the viscosity stability beyond four weeks, but phytic acid addition alone in composition C is no better than the control composition A.

In compositions D, E and F, the higher level of benzoic acid in E increases the viscosity retention even further in comparison to control composition D. Phytic acid is added in composition F in addition to the benzoic acid used in composition D, and it is noted that the physical stability is increased and maintained beyond the control composition D and composition E.

In a like manner, stability tests at 120° F. temperature exhibit results consistent with those at 100° F., but over a shorter period of time.

It is desirable to keep the composition viscosity on aging above about 80% of the initial viscosity to ensure physical and chemical quality maintenance. It is seen that the phytic acid extends the ability to achieve that objective when used in combination with a theology stabilizing agent, e.g., benzoic acid.

The available chlorine of compositions A–E, as a percentage of initial, has dropped by week 8 of the test to values of 0.44, 0.46, 0.36, 0.38, 0.42 and 0.31%, respectively. The directionally lower values in the two compositions containing phytic acid is believed to be due to reaction early in the test between the hypochlorite and by-products in the practical grade of the phytic acid. It is believed that a higher purity grade phytic acid or a pre-treatment of the phytic acid to remove these organic by-products would result in increased viscosity stability plus at least equivalent available chlorine stability.

What is claimed is:

1. An aqueous, thickened liquid or gel cleaning composition having improved physical and chemical stability, said composition comprising, by weight:

(a) a chlorine bleach ingredient providing from about 0.2 to 2.5% available chlorine;

(b) from about 0.1 to 10% of a cross-linked polycarboxylate polymer thickening agent having a molecular weight of from about 500,000 to 5,000,000;

(c) from about 0.05 to 5% of phytic acid; which is substantially free of hypochlorite-reactive species;

(d) from about 0.05 to 5% of a free radical scavenging rheology stabilizing agent;

(e) sufficient alkalinity buffering agent to provide said composition with a pH greater than about 10; and (f) at least about 15% water.

2. The composition of claim 1 wherein the composition is an automatic dishwashing detergent composition further comprising:

(a) from 0% to about 5% of a detergent surfactant; and (b) from about 5 to 50% of a detergency builder material.

3. The composition of claim 2 further comprising, as an additional structuring agent from 0% to about 1% of an alkali metal salt of an amphoteric metal anion; said composition having an apparent yield value of from about 40 to 800 dynes/$cm^2$.

4. The composition of claim 1 wherein the chlorine bleach ingredient is selected from the group consisting of sodium hypochlorite, potassium hypochlorite, and mixtures thereof.

5. The composition of claim 1 comprising the chlorine bleach ingredient providing from about 0.5 to 1.5% available chlorine based on the weight of the composition.

6. The composition of claim 4 comprising the chlorine bleach ingredient providing from about 0.5 to 1.5% available chlorine based on the weight of the composition.

7. The composition of claim 1 wherein the molecular weight of the polycarboxylate polymer thickening agent is from about 750,000 to 4,000,000.

8. The composition of claim 1 comprising from about 0.25 to 5% of the polycarboxylate polymer thickening agent.

9. The composition of claim 7 comprising from about 0.5 to 2% of the polycarboxylate polymer thickening agent.

10. The composition of claim 8 comprising from about 0.5 to 2% of the polycarboxylate polymer thickening agent.

11. The composition of claim 1 comprising from about 0.2% to 1% benzoic acid.

12. The composition of claim 1 comprising from about 0.1% to about 2% of the phytic acid.

13. The composition of claim 12 comprising from about 0.2% to about 1% of the phytic acid.

14. The composition of claim 3 comprising from about 0.2% to about 1% of the phytic acid.

15. The composition of claim 1 wherein the alkalinity buffering agent is selected from the group consisting of alkali metal silicates, alkali metal carbonates, alkali metal hydroxides, and mixtures thereof.

16. The composition of claim 1 comprising sufficient alkalinity buffering agent to provide the composition with a pH greater than about 11.5.

17. The composition of claim 15 comprising sufficient alkalinity buffering agent to provide the composition with a pH greater than about 11.5.

18. The composition of claim 2 wherein the surfactant is selected from the group consisting of capped propylene oxide, ethylene oxide block copolymers; condensation products of ethylene oxide and propylene oxide with a mono-, di-, or poly-hydroxyl compound with residual hydroxyls capped; alkali metal salts of mono- and/or di-($C_{8-14}$) alkyl diphenyl oxide mono- and/or di-sulfonates; $C_{8-18}$ alkyl sulfates; $C_{8-18}$ alkyl sulfonates; and mixtures thereof.

19. The composition of claim 2 comprising from about 0.1% to about 2.5% of the surfactant.

20. The composition of claim 18 comprising from about 0.1% to about 2.5% of the surfactant.

21. The composition of claim 2 wherein the builder is selected from the group consisting of alkali metal tripolyphosphate, alkali metal pyrophosphate, alkali metal silicates, alkali metal carbonates, polycarboxylates, and mixtures thereof.

22. The composition of claim 2 comprising from about 15% to about 40% of the builder.

23. The composition of claim 21 comprising from about 15% to about 40% of the builder.

24. The composition of claim 3 wherein the alkali metal salt of an amphoteric metal anion is selected from the group consisting of sodium or potassium aluminate, sodium or potassium zincate, sodium or potassium stannate (IV), sodium or potassium titanate (IV), and mixtures thereof.

25. The composition of claim 3 comprising from about 0.01% to about 0.1% of the alkali metal salt of an amphoteric metal anion.

26. The composition of claim 24 comprising from about 0.01% to about 0.1% of the alkali metal salt of an amphoteric metal anion.

27. The composition of claim 18 wherein the builder is selected from the group consisting of alkali metal tripolyphosphate, alkali metal pyrophosphate, alkali metal silicates, alkali metal carbonates, polycarboxylates, and mixtures thereof; and the chlorine bleach ingredient is selected from the group consisting of sodium hypochlorite, potassium hypochlorite, and mixtures thereof.

28. The composition of claim 27 wherein the molecular weight of the polycarboxylate polymer thickening agent is from about 750,000 to 4,000,000.

29. The composition of claim 28 wherein the alkalinity buffering agent is selected from the group consisting of alkali metal silicates, alkali metal carbonates, alkali metal hydroxides, and mixtures thereof; and the composition has a pH greater than about 11.5.

30. The composition of claim 2g wherein the alkali metal salt of an amphoteric metal anion is selected from the group consisting of sodium or potassium aluminate, sodium or potassium zincate, sodium or potassium stannate (IV), sodium or potassium titanate (IV), and mixtures thereof.

31. The composition of claim 30 comprising from about 0.01 to 0.1% of the alkali metal salt of an amphoteric metal anion.

32. An aqueous, shear-thinning thickened liquid or gel automatic dishwashing detergent composition having improved physical and chemical stability, said composition comprising, by weight:

(a) a chlorine bleach ingredient providing from about 0.5 to 1.5% available chlorine;

(b) from about 0.5% to 2% of a cross-linked polycarboxylate polymer thickening agent having a molecular weight of from about 750,000 to 400,000;

(c) from about 0.2 to 1% of phytic acid that is substantially free of hypochlorite-reactive species;

(d) from about 0.2 to 1% of a free radical scavenging rheology stabilizing agent;

(e) from about 0.1 to 2.5% of detergent surfactant;

(f) from about 15 to 40% of a detergency builder material;

(g) sufficient alkalinity buffering agent to provide said composition with a pH greater than about 11.5; and (h) at least about 15% water.

* * * * *